(12) United States Patent
Thevenon et al.

(10) Patent No.: US 7,782,455 B2
(45) Date of Patent: Aug. 24, 2010

(54) SPECTROGRAPH WITH A TILTED DETECTOR WINDOW

(75) Inventors: Alain Thevenon, Bretigny-sur-Orge (FR); Viviane Millet, Linas (FR); Pierre-André Corde, Champigny-sur-Marne (FR)

(73) Assignee: Horiba Jobin-Yvon S.A.S., Longjumeau Cedex (FR)

( * ) Notice: Subject to any disclaimer, the term of this patent is extended or adjusted under 35 U.S.C. 154(b) by 18 days.

(21) Appl. No.: 12/039,517

(22) Filed: Feb. 28, 2008

(65) Prior Publication Data

US 2009/0231579 A1 Sep. 17, 2009

(51) Int. Cl.
*G01J 3/02* (2006.01)
*G01J 3/18* (2006.01)
*G01J 3/28* (2006.01)

(52) U.S. Cl. .................................. 356/305; 358/328

(58) Field of Classification Search ............... 356/305, 356/328
See application file for complete search history.

(56) References Cited

U.S. PATENT DOCUMENTS 4,633,078 A * 12/1986 Ferber .................. 356/326
6,859,274 B2 * 2/2005 Inamoto ................ 356/326

* cited by examiner

*Primary Examiner*—F. L Evans
(74) *Attorney, Agent, or Firm*—Brooks Kushman P.C.

(57) ABSTRACT

The invention concerns a spectrograph with a tilted detector window comprising a light source (1), an entrance slit (3), a grating (4), a detector (5) comprising a window through which the light beam diffracted by the grating (4) is transmitted, a part of the diffracted light beam generating reflections on the window or between the window and sensitive surface of the detector (5) and at least a means for inclining able to avoid interference spectra. According to the invention, the at least a means for inclining able to avoid interference spectra comprises the detector window (6, 11) which is an inclined detector window (11).

7 Claims, 2 Drawing Sheets

SPECTROGRAPH WITH A TILTED DETECTOR WINDOW

The present invention concerns a spectrograph with a tilted detector window.

Prior art spectrographs comprise a light source, an entrance slit, a diffraction grating, which can be a concave holographic grating and a detector. FIGS. 1 and 2 represent an example of a grating spectrograph according to the prior art. FIG. 1 is a three dimension view of the spectrograph and FIG. 2 corresponds to a top view.

Concave holographic gratings have an optical surface whereon a large number of lines has been written (up to 6000 lines/mm), in order to diffract any incident light beam. Preferably the gratings work in reflection.

Concave holographic gratings are usually corrected from aberrations.

The detector can be a PDA (Photodiode array) or a CCD (Charge Coupled Device) type of detector. The material used for the detector can be silicon or InGaAs for example, with a highly reflecting surface.

It is possible to use a cooled detector. Such a cooled detector comprises a window which protects the sensitive detector surface. This window is necessary in order to avoid condensation phenomena on the detector surface.

Multiple reflections produced inside the window and between the window faces and the detector surface greatly decrease the signal to noise ratio, by superimposing interference spectra to the spectrum to be measured.

In order to reduce the influence of these phenomena on the performance of the spectrograph, it is known to use a grating which is selected in order to produce a tilted spectrum. In this way, interference beams reflected on the sensitive surface of the detector do not return toward the grating. Re-diffraction phenomena, at the root of interference light problems harmful to the instrument performances, are thus avoided.

A method is also known, consisting in inclining the detector around an axis parallel to the spectrum so that multiple reflections between the detector and the window faces are directed partially or totally outside the sensitive surface of the detector in the direction perpendicular to the dispersion. In general, this effect decreases the instrument spectral resolution.

Both previous methods, each using means for inclining, can be used separately or together.

It is also known to use an order selection filter tilted in front of the detector in order to reject a new contribution to interference spectra.

These methods improve the spectrograph background noise. However, they greatly decrease the instrument spectral resolution.

The goal of the present invention is thus to propose a solution to avoid contribution of interference spectra to the spectrum to be measured without compromising the spectral resolution.

To this end, the invention concerns a spectrograph with a tilted detector window comprising:
- a light source able to emit a light beam,
- an entrance slit able to transmit a part of the light beam emitted by the light source and to generate a transmitted light beam,
- a grating able to diffract the light beam transmitted through the entrance slit and to generate a diffracted light beam and a spectrum in an image plane (X', Y'),
- a detector able to detect the light beam diffracted by the grating, said detector comprising a window through which the light beam diffracted by the grating (4) is transmitted, a part of the diffracted light beam generating reflections on the window or between the window and the sensitive surface of the detector contained in a detection plane (X", Y"), and
- at least a means for inclining able to avoid interference spectra.

According to the invention, the at least a means for inclining able to avoid interference spectra comprises the detector window which is an inclined detector window.

According to different possible embodiments, the present invention also concerns the features that will stand out from the following description and that can be considered alone or according to all their possible technical combinations:
- the inclined detector window is inclined at an angle (γ) with respect to the detector's detection plane (X", Y"),
- the angle (γ) is above 0° and less than 45°,
- the tilted detector window spectrograph comprises at least another means for inclining able to avoid interference spectra,
- the at least another means for inclining able to avoid interference spectra comprises a selection filter which is inclined and placed between the grating and the detector,
- the at least another means for inclining able to avoid interference spectra comprises the detector which is a detector inclined at an angle (α), said detector inclined at an angle (α) being inclined so that the detection plane (X", Y") of said detector is inclined at an angle (α) with respect to the image plane (X',Y') of the grating, and said angle (α) being defined in the (Y", Z") plane, orthogonal to the detection plane (X", Y"),
- the at least another means for inclining able to avoid interference spectra comprises the grating which is a grating selected so that the spectrum it produces is inclined at an angle (β) with respect to the detection plane (X", Y") of the detector.

The invention will be described more in details in reference to the annexed drawings in which:

FIG. 1 is a three dimensions view of a concave holographic grating spectrograph according to prior art. FIG. 2 represents the corresponding top view.

Figure 1:
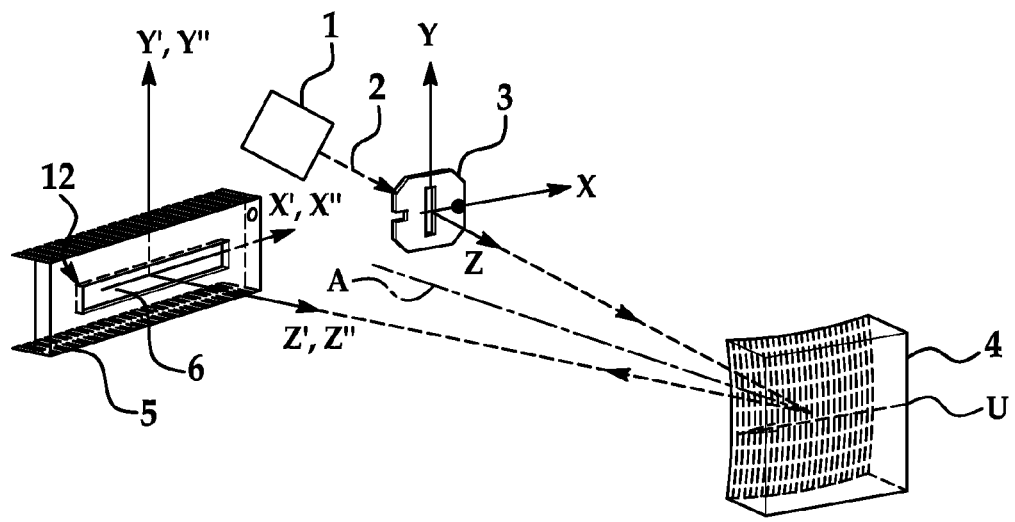
FIGS. 1 and 2 are respectively a three dimension representation and a top view of a spectrograph with a tilted detector window and concave holographic grating according to prior art.

Such a spectrograph comprises a light source 1 that emits a light beam directed onto an entrance slit 3 following a direction 2, parallel to an axis Z. The entrance slit 3 is defined with respect to the (X, Y, Z) coordinates. The entrance slit 3 is located in the (X, Y) plane.

The term entrance slit 3 here stands for an aperture in a support or any other means for blocking a part of the light beam emitted by the light source 1 and for transmitting the other part of that beam.

The light source 1 illuminates almost uniformly the entrance slit 3 directly or using coupling optics.

A transmitted light beam exits from the entrance slit 3.

The light beam transmitted through the entrance slit 3 is incident upon a grating 4 that can be a concave holographic grating or else. A diffracted light beam is obtained and a spectrum is formed in the image plane (X', Y'). The image plane is defined according to the (X', Y', Z') coordinates, where the Z' axis is orthogonal to the image plane (X', Y').

The entrance slit 3 is rectangular and extends longitudinally following the Y axis. The grating 4 is a concave holographic grating. The lines of this concave holographic grating 4 are curved and set one after the other following an axis U. The longitudinal axis Y is normal to the alignment axis U and to the axis Z. The concave holographic grating 4 presents an axis A normal to the axis U and passing through the curved grating surface summit.

An order selection filter can eventually be inserted in the beam after the grating 4.

The light beam diffracted by the grating 4 is detected by a detector 5. The detector 5 is placed on the beam path of the light diffracted by the grating 4 in order to intercept the spectrum contained in the image plane (X', Y').

The detector 5 is defined according to (X", Y", Z") coordinates. The plane (X", Y") represents the detection plane that is orthogonal to the Z" axis.

The detector 5 comprises a sensitive surface that is in the detection plane (X", Y") of the detector 5.

Figure 2:
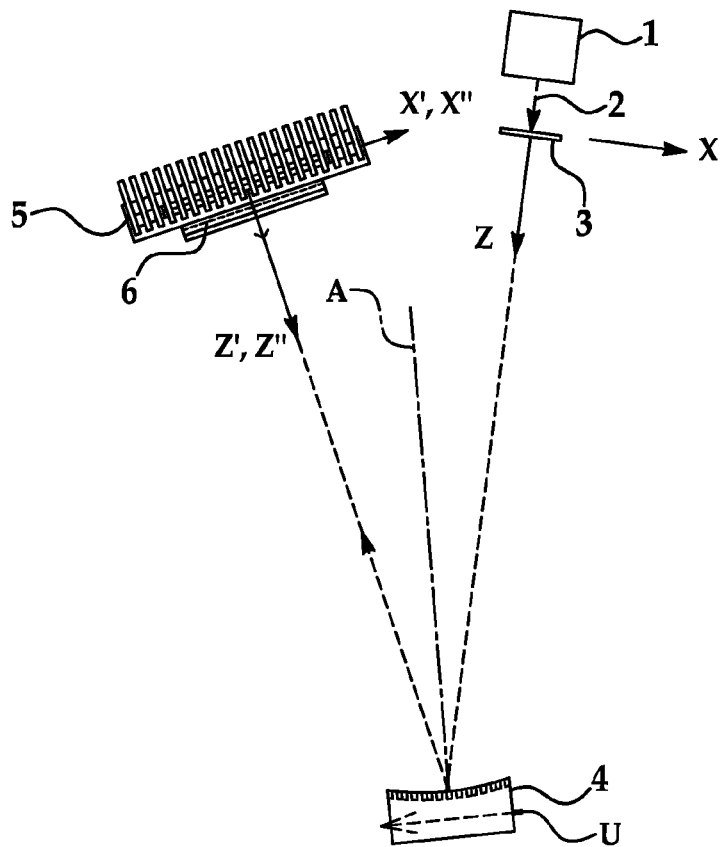

In order to clarify the figures, only one side of the detector 5 is represented on FIGS. 1 and 2, and following. This side comprises a detector aperture 12 through which the diffracted light beam goes, before reaching the sensitive surface of the detector.

In the example of FIGS. 1 and 2, the sensitive surface of the detector 5 is in the image plane (X', Y') of the grating 4. Consequently, the image plane (X', Y') is merged with the detection plane (X", Y") of the detector 5. The Z' and Z" axis are also merged.

The concave holographic grating spectrograph can comprise optical means such as mirrors for reflecting and focusing the light beam transmitted through the slit 3, the diffracted beam, and eventually the dispersed beam.

The detector 5 often comprises a window 6, 11 through which the light beam diffracted by the grating 4 is transmitted.

A part of the diffracted light beam generates multiple reflections on the window 6 or between said window and the sensitive surface of the detector 5.

As said above, for removing these reflections, it is known to use at least a means for inclining able to avoid that interference spectra superimpose to the spectrum to be measured.

As a matter of fact, prior art means for inclining consist in inclining either the spectrum to be measured, that is the image plane (X', Y') of the grating 4, with respect to the detection plane (X", Y") of the detector 5, either the detection plane (X", Y") of the detector 5.

They allow improving the background noise of the spectrograph. On the other hand, they greatly reduce the spectral resolution of the instrument.

Figure 3:
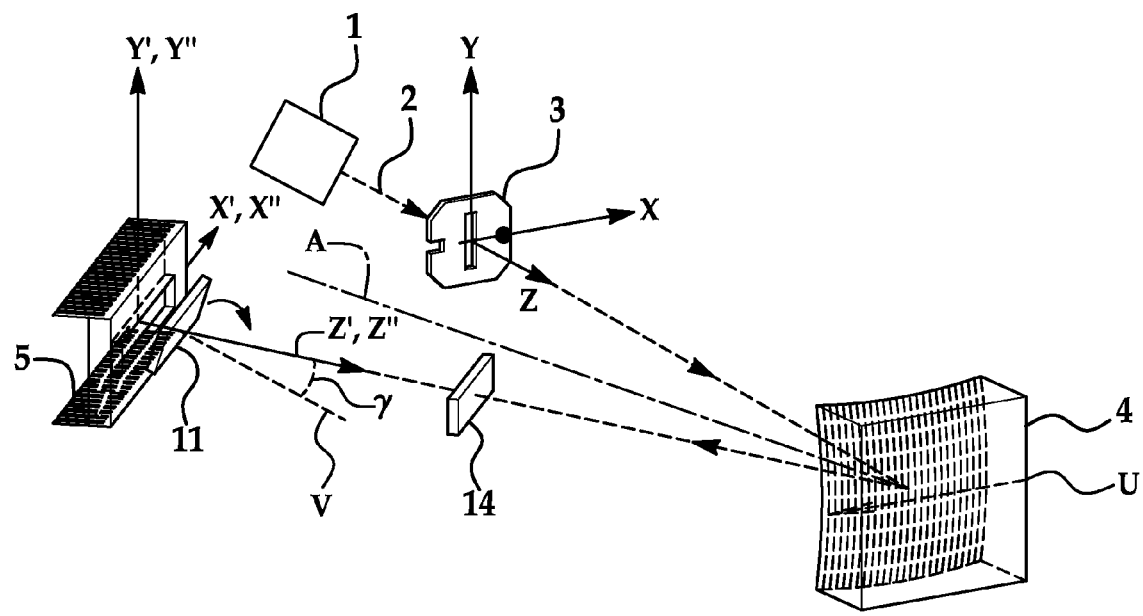
FIGS. 3 and 4 are respectively a three dimensions view and a top view of a tilted detector window spectrograph, according to an embodiment of the invention.
Figure 4:
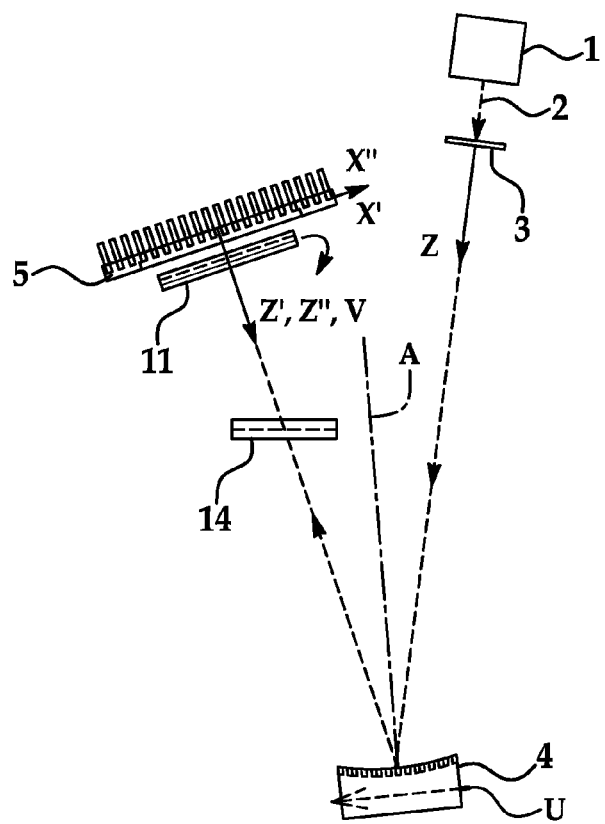

According to an embodiment of the invention, represented on FIGS. 3 and 4, the means for inclining able to avoid interference spectra comprise the detector window 6, 11 that is an inclined window 11.

FIGS. 3 and 4 correspond to a three dimension view and a top view, respectively, of a spectrograph with a tilted detector window.

The tilted detector window 11 is inclined at an angle ($\gamma$) with respect to the detection plane (X", Y") of the detector 5.

On FIG. 3, the detector window 11 is inclined downwards. It can also be inclined upwards.

The normal V to the surface of the inclined detector window 11 makes an angle ($\gamma$) with the Z" axis, which is perpendicular to the detection plane (X", Y"). Then, the surface of the inclined detector window 11 makes an angle ($\gamma$) with the detection plane (X", Y").

The angle ($\gamma$) is above 0° and less than 45°.

The inclination of the slit enables to avoid that interference beams bounce between the sensitive surface of the detector 5 and the inclined slit 11 which sends beams away from the sensitive surface. Reflections between the faces of the inclined window 11 are also deflected.

This method enables to avoid interference spectra without tilting neither the image plane (X', Y') of the grating 4, nor the detection plane (X", Y") of the detector 5, which results in avoiding almost completely spectral resolution losses.

According to another embodiment of the invention, the tilted detector window spectrograph can comprise at least another means for inclining able to avoid interference spectra.

This other means for inclining can be an order selection filter 14 that is inclined and placed between the grating 4 and the detector 5.

The other means for inclining able to avoid interference spectra can comprise the detector 5 that is a detector inclined at an angle ($\alpha$). The detector inclined at an angle ($\alpha$) is inclined so that the detection plane (X", Y") of the detector is inclined at an angle ($\alpha$) with respect to the image plane (X', Y') of the grating 4. The angle ($\alpha$) is defined in the (Y", Z") plane, orthogonal to the detection plane (X", Y").

The other means for inclining able to avoid interference spectra can also comprise the grating 4 that is a grating selected so that the spectrum it produces is inclined at an angle ($\beta$) with respect to the detection plane (X", Y") of the detector 5.

So, the invention enables to avoid superposition of interference spectra to the spectrum to be measured without losing spectral resolution, in a simple and low cost manner.

The invention claimed is:

1. Spectrograph with a tilted detector window comprising:
   a light source (1) able to emit a light beam,
   an entrance slit (3) able to transmit a part of the light beam emitted by the light source (1) and to generate a transmitted light beam,
   a grating (4) able to diffract the light beam transmitted through the entrance slit (3) and to generate a diffracted light beam and a spectrum in an image plane (X', Y'),
   a detector (5) able to detect the light beam diffracted by the grating (4), said detector (5) comprising a window (6, 11) through which the light beam diffracted by the grating (4) is transmitted, a part of the diffracted light beam generating reflections on the window (6, 11) or between the window and the sensitive surface of the detector (5) contained in a detection plane (X", Y"), at least a means for inclining able to avoid interference spectra, characterised in that:
   the at least a means for inclining able to avoid interference spectra comprises the detector window (6, 11) which is an inclined detector window (11).

2. Spectrograph with a tilted detector window according to claim 1, characterised in that the inclined detector window (11) is inclined at an angle ($\gamma$) with respect to the detection plane (X", Y") of the detector (5).

3. Spectrograph with a tilted detector window according to claim 2, characterised in that the angle ($\gamma$) is above 0° and less than 45°.

4. Spectrograph with a tilted detector window according to any of claims 1 to 3, characterised in that it comprises at least another means for inclining able to avoid interference spectra.

5. Spectrograph with a tilted detector window according to claim 4, characterised in that the at least another means for inclining able to avoid interference spectra comprises a selection filter (14) which is inclined and placed between the grating (4) and the detector (5).

6. Spectrograph with a tilted detector window according to claim 5, characterised in that the at least another means for inclining able to avoid interference spectra comprises the detector (5) which is a detector inclined at an angle ($\alpha$), said detector inclined at an angle ($\alpha$) being inclined so that the detection plane (X",Y") of said detector is inclined at an angle ($\alpha$) with respect to the image plane (X',Y') of the grating (4), and said angle ($\alpha$) being defined in the plane (Y", Z"), orthogonal to the detection plane (X",Y").

7. Spectrograph with a tilted detector window according to claim 4, characterised in that the at least another means for inclining able to avoid interference spectra comprises the grating (4) which is a grating selected so that the spectrum it produces is inclined at an angle ($\beta$) with respect to the detection plane (X",Y") of the detector (5).

* * * * *

UNITED STATES PATENT AND TRADEMARK OFFICE
CERTIFICATE OF CORRECTION

PATENT NO. : 7,782,455 B2  Page 1 of 1
APPLICATION NO. : 12/039517
DATED : August 24, 2010
INVENTOR(S) : Alain Thevenon, Viviane Millet and Pierre-Andre Corde It is certified that error appears in the above-identified patent and that said Letters Patent is hereby corrected as shown below:

On the title page, please insert after Prior Publication Date:

Item --(30)    Foreign Application Priority Data
February 28, 2007    (FR).....................................07 53563--

Signed and Sealed this
Twenty-fifth Day of January, 2011

David J. Kappos
*Director of the United States Patent and Trademark Office*